Patented Mar. 4, 1924.

1,486,042

UNITED STATES PATENT OFFICE.

RICHARD SCHUSTER, OF BERLIN-HALENSEE, GERMANY, ASSIGNOR TO SCHUSTER-ADAMS CHEMICAL COMPANY, A CORPORATION OF DELAWARE.

GALVANIC ELEMENT.

No Drawing. Application filed August 25, 1923. Serial No. 659,380.

*To all whom it may concern:*

Be it known that I, RICHARD SCHUSTER, a citizen of Germany, residing at Berlin-Halensee, Germany, 94 Paulsbornerstrasse, have invented certain new and useful Improvements in a Galvanic Element, of which the following is a specification.

My invention relates to a galvanic element working in a known manner with two electrolyte fluids usually separated by a diaphragm and with two electrodes, of carbon and of zinc respectively. The carbon electrode is surrounded in a known manner by an electrolyte, consisting of about 560 grammes bichromate of soda, 1000 cubic centimetres of water and 590 cubic centimetres of concentrated sulphuric acid. The zinc electrode may be arranged in an electrolyte, preferably consisting of a solution of potash.

Trials and scientific calculations have shown, that by certain compositions of the electrolytes a maximum output of current and minimum consumption of the chemicals employed may be obtained. The following compositions have proven to be highly efficient:

Under some conditions: For the carbon electrolyte, I use 14.73% bichromate of soda, 48.45% of sulphuric acid, 36.82% water. For the zinc electrolyte: 18% solution of potash.

Under other conditions: For the carbon electrolyte, I use 18.86% bichromate of soda, 43.39% sulphuric acid, 37.75% water. For the zinc: sulphate of potash in saturated solution (water only for the zinc would suffice).

Changes of the above compositions to a certain degree are admitted. Such changes produce usually very little differences in the production of current and consumption of materials, furthermore these ingredients may be replaced by others, for instance for the solution of potash I may use a solution of soda, for the sulphate of potash I may use sulphate of potash and sulphate of soda or sulphate of potash and sulphate of magnesia. This however, will sometimes increase the cost of the element and will show certain disadvantages.

In order to make the electrolytes more easily transportable they may be transformed into a solid form or jelly-like mass. For this purpose a binding material should be added to the original materials which will not interfere with the activity of the working chemicals, for instance silicate of potash or silicate of soda or both together. When so mixed it may be possible to transport the chemicals for the electrolytes with the electrodes. The chemicals in solid or jelly-like condition may be placed into cartridges of clays or the like (porous pots) sealed up, or into tubes of asbestos, paper, saturated in hot paraffin wax, or into tubes of lead and the like, and by inserting a cartridge into an element, of which the carbon electrolyte has been used up entirely or partly, the electrolyte will be replenished.

I claim:

1. A galvanic element having a carbon electrode and a zinc electrode arranged in two electrolytes, the carbon electrolyte comprising an alkali bichromate, sulphuric acid and water and the zinc electrolyte, a solution of an alkali, to which sulphuric acid has been added until neutralization is attained.

2. A galvanic element having a carbon electrolyte comprising an alkali bichromate, sulphuric acid and water transformed by the addition of silicate of an alkali into a solid or semi-solid substance soluble in water, and a zinc electrolyte of a solution of an alkali.

3. A galvanic element having the carbon electrode and the zinc electrode arranged in two electrolytes, the carbon electrolyte comprising bichromate of soda, sulphuric acid and water transformed by the addition of a silicate of an alkali into a solid or semi-solid substance soluble in water and neutralized by the addition of an acid.

4. A galvanic element having the carbon electrode and the zinc electrode arranged in two electrolytes, the carbon electrolyte comprising bichromate of soda, sulphuric acid and water transformed by the addition of a silicate of an alkali into a solid or semi-solid substance soluble in water, and a zinc electrolyte of a solution of an alkali neutralized by sulphuric acid.

5. A galvanic element having the carbon electrode and the zinc electrode arranged in two electrolytes separated by a diaphragm, the carbon electrolyte consisting of bichromate of soda, sulphuric acid and water transformed by the addition of silicate of soda into a solid or semi-solid substance soluble in water and a zinc electrolyte of a solution of potash.

6. A galvanic element having the carbon electrode and the zinc electrode arranged in two electrolytes separated by a diaphragm, the carbon electrolyte comprising bichromate of soda, sulphuric acid and water transformed by the addition of silicate of soda into a solid or semi-solid substance soluble in water and neutralized by an acid.

7. A galvanic element having the carbon electrode and the zinc electrode arranged in two electrolytes, the carbon electrolyte comprising bichromate of soda, sulphuric acid and water transferred by the addition of silicate of an alkali into a solid or semi-solid substance soluble in water and a zinc electrolyte of a solution of potash neutralized by sulphuric acid.

8. A galvanic element having the carbon electrode and the zinc electrode arranged in two electrolytes, the carbon electrolyte comprising bichromate of soda, sulphuric acid and water transformed by the addition of silicate of potash into a solid or semi-solid substance soluble in water and a zinc electrolyte of a solution of an alkali neutralized by sulphuric acid transformed also in a solid or semi-solid substance.

9. A galvanic element, having the carbon electrode and the zinc electrode arranged in electrode and the zinc electrode arranged in two electrolytes separated by a diaphragm, the carbon electrolyte comprising a bichromate alkali, sulphuric acid and water transformed by the addition of silicate of an alkali into a solid or semi-solid substance soluble in water and a zinc electrolyte of a solution of an alkali neutralized by sulphuric acid transformed also in a solid or semi-solid substance.

10. A galvanic element having the carbon electrode and the zinc electrode arranged in two electrolytes separated by a diaphragm, the carbon electrolyte transformed by the addition of silicate of potash and silicate of soda into a solid or semi-solid substance neutralized by an acid, and a zinc electrolyte also transformed into a solid or semi-solid substance.

In testimony whereof I have affixed my signature.

RICHARD SCHUSTER.